3,328,360
POLYMERS CONTAINING PHOSPHORUS

Andrzej Rozanski, Elizabeth, Harold N. Miller, Plainfield, and Hugh H. Horowitz, Elizabeth, N.J., assignors to Esso Research and Engineering Company, a corporation of Delaware
No Drawing. Filed July 6, 1962, Ser. No. 208,122
10 Claims. (Cl. 260—79)

This invention relates to polymeric materials containing phosphorus. More specifically, this invention relates to methods of preparing such polymeric materials, to the polymeric materials themselves, to their derivatives, to the uses of such materials as well as to the uses of their derivatives, and to compositions containing said materials.

DISCOVERY

It has now been discovered that certain direactive, i.e., difunctional, compounds will react with phosphorus and sulfur under certain conditions as hereinafter defined to form novel polymeric materials. These novel polymeric materials may be prepared according to the following generalized chemical reaction:

$$\text{H—X—R—Y—H} + \text{P}_4\text{S}_{10} \rightarrow \left(\begin{array}{c}\overset{\text{S}}{\underset{\text{SH}}{\text{—X—R—Y—P—}}}\end{array}\right)_n + \text{H}_2\text{S (gas)}$$

wherein $$\left(\begin{array}{c}\overset{\text{S}}{\underset{\text{SH}}{\text{—X—R—Y—P—}}}\end{array}\right)$$

represents the probable monomeric structure of the polymer; P, S and H represent their respective elements; X and Y each represent a member selected from the group consisting of O, S and NH (X and Y may be the same or different members); R represents a molecular skeleton providing at least 2 atoms between the X, Y members, e.g., H—X—(CH$_2$)$_2$—Y—H; and $n$ represents the number of monomeric groups in the polymer. $n$ is believed to usual range from 2 to 500 or more. Exact determination of the number of monomeric groups is difficult and thus the molecular weights of the polymers are more readily characterized by reference to their intrinsic viscosities. The separation of the X and Y members by at least 4 atoms will usually avoid side reactions leading to the formation of undesired cyclic reaction products. In a preferred form of this invention, the X, Y members will be separated by 5 or more atoms. The R group may be alkylene, arylene, alkarylene and aralkylene or it may be a divalent organic radical having oxygen, sulfur or nitrogen atoms incorporated into its skeletal backbone. The R group may also contain substituents such as halogen atoms, ether groups, thioether groups, carboxylic groups, and ester groups. Note particularly the description hereinafter given with reference to the suitable directive compounds under the heading "Suitable Reactants."

PREPARATION

One technique for forming these polymeric materials is to heat the reactants together so as to evolve hydrogen sulfide. Generally, the mole ratio of the direactive compound to P$_4$S$_{10}$ will be from 1:1 to 10:1. More usually, about 4 moles of the direactive compound will be employed per mole of P$_4$S$_{10}$. The reaction, accompanied by hydrogen sulfide evolution, will usually take place at temperatures of from 30° to 150° C., e.g., from 40° to 100° C. The reaction is usually performed in some suitable inert solvent, such as toluene, and is allowed to progress for a period of time in the range of 0.2 to 100 hours, e.g., 0.5 to 35 hours. The solvent is then separated from the polymeric product by normal techniques, e.g., distillation. The polymeric materials which are recovered from this process can be described, in general, as tough, rubbery materials which are generally, but not always, soluble in toluene and usually insoluble in paraffinic hydrocarbons, e.g., hexane. In appearance, the polymers normally are transparent, colored, non-tacky, rubber-like materials. Their intrinsic viscosities in toluene will usually range from 0.04 dl./gm. to 0.40 dl./gm. The molecular weight of the polymeric materials, as indicated by their intrinsic viscosities, may vary considerably. The molecular weight (chain length) can be controlled by varying the following: length of reaction time, temperature, concentration of reactants, etc.

SUITABLE REACTANTS

The polymeric materials formed in accordance with the teachings of the present invention are characterized as the reaction product of the direactive compound (e.g., dihydroxy, diamino, hydroxy-amino, etc.) with a phosphosulfurizing agent.

The preferred phosphosulfurizing agent is phosphorus pentasulfide which is thought to be present in the form of P$_4$S$_{10}$. Alternate phosphosulfurizing agents, e.g., a mixture of elemental phosphorus and sulfur, will be obvious to others skilled in the art.

The direactive compounds used for preparing these novel polymeric materials are described by the following general formula:

$$\text{H—X—}\underset{\text{R}^2}{\overset{\text{R}^1}{\text{C}}}\text{—}\left(\underset{\text{R}^4}{\overset{\text{R}^3}{\text{Z}}}\right)_m\text{—}\underset{\text{R}^6}{\overset{\text{R}^5}{\text{C}}}\text{—Y—H}$$

wherein X and Y each represent a member selected from the group consisting of O, S and NH (X and Y may be the same or different); Z represents a non-reactive atom or mixture of atoms (non-reactive only as relates to this polymerizing reaction) e.g., carbon, phenylene, nitrogen, oxygen, sulfur, —(CH$_2$—O—CH$_2$)—, etc.; R$^1$, R$^2$, R$^3$, R$^4$, R$^5$, and R$^6$ represent hydrogen or organic radicals or may be non-existent if the adjacent non-reactive atom has no available valence electrons, e.g., R$^3$ and R$^4$ would be non-existent when Z represented oxygen; and $m$ is 0 to 20, e.g., 0 to 12. Generally, 4 or 5 of the R$^1$ to R$^6$ groups will represent hydrogen, with the remaining group or groups representing alkyl radicals containing from 1 to 20 carbon atoms each, which may be substituted or unsubstituted. The more preferred starting materials for use as hereinafter contemplated are the diols and diamines. Illustrative of the suitable reactants are:

1,5-pentanediol;
1,10-decanediol;
1,12-octadecanediol;
1,8-octanediol;
2-ethyl 1,3-dimethylolpropane;
2,5-dimethylolhexane;
2-methyl 1,6-hexanediol;
4-phenyl 1,7-heptanediol;
cadaverine;
1,5-anthradiamine;
3,3'-biphenyldiamine;
1,15-pentadecanediol;
4(p-hydroxy phenyl)-2-butanol;
1,5-naphthalenedimethanol;
1,5-naphthalenediol;
4-butyl amino aniline;
1,10-decanedithiol;
1,5-butanedithiol;
triethaneolamine monocarboxylates;
pentaerythritol diesters; and
monostearin.

The term "phosmer" as hereinafter employed in this application is a term coined by the present inventors and used to denote the polymeric material formed by reacting a direactive compound with a phosphosulfurizing agent. The term "phosmer" is used to describe both the polymeric and phosphorus-containing characteristic of these novel polymeric materials. While, for simplicity, the polymeric materials of the present invention will be referred to generically as phosmers, specific polymeric materials will be described with reference to the direactive compounds from which the phosmer is formed, e.g., cadaverine phosmer; 1,6-hexanediol phosmer; etc.

SUITABLE SOLVENTS

Suitable solvents for use during the polymer-forming reaction include, in general, alkyl aromatic and heterocyclic solvents, e.g., toluene, pyridine, etc. Alkanes, e.g., hexane, are usually not suitable. The suitable solvents are employed to achieve a homogeneous mixture of the reactants and thus facilitate the reaction. Some solvents will solubilize the phosmer formed during the reaction, thus preventing its deposition on the solid particles of $P_4S_{10}$. Some solvents, e.g., pyridine, will solubilize the $P_4S_{10}$. This solubilizing of the $P_4S_{10}$ and/or the phosmer is desirable, but not essential. The solvents can be subsequently removed from the phosmers. The method employed for solvent removal will depend usually upon the solubility of the resulting phosmer in the solvent. When the phosmer is insoluble, filtration followed by washing is effective. When the phosmer is soluble, distillation, i.e., evaporation of the solvent, is effective.

EXAMPLES

This invention will be more fully understood by reference to the following examples which include a preferred embodiment:

Example 1

22.6 grams (ca. 0.05 mole) of phosphorus pentasulfide ($P_4S_{10}$) suspended in 150 mls. of toluene were heated to 40° C. Then, 34.8 gms. (ca. 0.20 mole) of 1,10-decanediol were slowly added to the suspension, with stirring, to form a mixture. The resulting mixture was heated to 80° C. and maintained at that temperature for about 2 hours. The mixture was then filtered to remove unreacted $P_4S_{10}$ while the phosmer remained dissolved in the toluene. 1,10-decanediol phosmer was recovered from the filtrate by evaporating the toluene and any unreacted 1,10-decanediol under reduced pressure. The phosmer residue was a transparent, gray-brown, non-tacky, rubber-like material having an intrinsic viscosity of 0.17 dl./gm. By analysis, the phosmer had the following composition by weight: percent C=46.1, percent H=8.7, percent P =10.2, percent S=22.2 and percent O=13.0. Theoretical calculations for the probable monomeric group

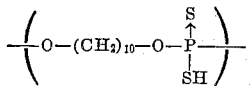

are: percent C=44.8, percent H=7.8, percent P=11.6, percent S=23.9, and percent O=11.9, which indicates that said monomeric group had been formed.

Example 2

11.6 grams (ca. 0.10 mole) of 1,6-hexanediamine were slowly added, with stirring, to a suspension of 11.1 gms. (ca. 0.025 mole) of $P_4S_{10}$ in 40 mls. of toluene at room temperature. This mixture was heated to 45° C. and maintained at that temperature for about 4 hours. The hexanediamine phosmer (which was insoluble in toluene) was recovered by filtration, washing with toluene to remove any unreacted hexanediamine and drying over anhydrous calcium sulfate. The phosmer was a reddish material, insoluble in common organic solvents, but slightly soluble in water.

Examples 3 to 9

Examples 3 to 9 were prepared by the general technique employed in Examples 1 and 2, but with a number of different diamino and dihydroxy compounds and using varying times and temperatures of reaction. Table I summarizes the reaction conditions for those examples and describes the appearance of the product formed.

TABLE I

| Example No. | Reactant | Solvent | Temperature (° C.) | Time (Hrs.) | Product Description |
|---|---|---|---|---|---|
| 3 | 1,5,n-pentanediol | Toluene | 80 | 3 | Transparent, rubbery. |
| 4 | 1,12,n-octadecanediol | do | 80 | 5 | Do. |
| 5 | Triethanolamine mono-oleate | do | 70 | 16 | Do. |
| | Pentaerythritol di (tall oil)[1] ester | do | 70 | 20 | Sticky, semisolid. |
| | 1-monostearin | do | 70 | 30 | Waxy, solid. |
| 8 | "Dimerdiamine"[2] | Pyridine | 50 | 2½ | Sticky, semisolid. |
| 9 | 1,5-naphthalenediol | Toluene | 100 | 24 | Gray, solid. |

[1] Tall oil is a commercially available mixture of $C_{18}$ unsaturated acids, i.e., oleic, linoleic, linolenic, etc.
[2] A Tradename of General Mills $C_{36}$ diamine.

DERIVATIVES

Numerous derivatives of the phosmers may be obtained. Derivatives may be prepared by reacting the phosmers with olefins, oxiranes, etc., e.g., beta butylene glycol, styrene, cyclopentadiene, maleate esters, octadecene-1, ethylene oxide, propylene oxide, etc. These reactions are generally characterized by bonding with the SH radical of the phosmer accompanied by the elimination of the hydrogen atom from that SH radical, thus forming a —S— link. Neutralization with ammonia and the amines also offers potentially valuable products, especially as lubricating oil additives.

Of the many derivatives of the phosmer which may be prepared, the olefin and oxirane derivatives are particularly important for use as oil additives.

The olefins which may be used will usually contain from 2 to 20 carbon atoms, e.g., 6 to 16, and preferably are alpha monoolefins. In preparing the olefin derivatives from normally liquid olefins, the phosmer, mixed with toluene or some other solvent, and preferably an excess of the olefin, i.e., more than one molecule of olefin per SH radical, are heated at about 110° C. for about 20 hours. The resulting olefin derivative can generally be precipitated from the solvent and unreacted olefin with acetone, followed by drying of the resulting precipitate to eliminate volatile contaminants, e.g., entrained solvent. With volatile olefins, vacuum distillation is a suitable recovery technique, since it will readily separate unreacted olefin and solvent from the product. Olefin derivatives may likewise be prepared from normally gaseous olefins by conducting the reaction under superatmospheric pressure.

Similarly, the oxiranes which may be used will usually contain from 2 to 20, preferably 2 to 4 carbon atoms. In preparing the oxirane derivatives, a slight excess, i.e., more than one molecule of oxirane per SH radical, of the liquid oxirane (e.g., ethylene oxide) is slowly added to a mixture of the phosmer and a solvent, e.g., toluene, at from 5° to 100° C. and maintained at that temperature for from 0.1 to 30 hours or more. The solvent and the excess oxirane are removed by distillation, thus leaving the oxirane derivative as a residue.

UTILITY

The phosmers are useful as chemical intermediates and their derivatives will find wide and varied applications. The phosmers themselves are useful as anti-wear agents and anti-oxidants, but are usually too corrosive to be used in the acid form. The phosmers are also useful as agricultural chemicals, especially as insecticides.

The derivatives of the phosmers are generally useful as lubricant additives—particularly as anti-wear agents, anti-oxidant agents, anti-corrosion agents and as viscosity-index improvers.

In general, lubricating compositions containing derivatives of the phosmers will comprise a major proportion of a lubricating oil and a minor proportion of the derivative. Usually these compositions will contain about 0.05 to 20 wt. percent and preferably about 0.5 to 8 wt. percent of the derivative. (Note: the wt. percents as hereinafter given are based on the total combined weight of the phosmer or its derivative and the lubricating oil, i.e., a 3 wt. percent solution means 3 parts by weight of the additive and 97 parts by weight of the oil.)

The lubricating oil base stocks used in the lubricating compositions prepared according to this invention may be straight mineral lubricating oils or distillates derived from paraffinic, naphthenic, asphaltic or mixed based crudes. Synthetic lubricating oils may also be used. Examples of these are esters of monobasic acids, e.g., the ester of $C_8$ Oxo-alcohol and $C_8$ Oxo-acid; esters of dibasic acids, e.g., di-2-ethylhexylsebacate; esters of glycols, e.g., $C_{13}$ Oxo-acid diester of tetraethylene glycol; esters of phosphoric acid, e.g., the ester formed by contacting 3 moles of monomethl ether of ethylene glycol with 1 mole of phosphorus oxychloride; halocarbon oils; alkyl silicates, polysilicones, polycarbonates, silane oils, polyoxyalkylene glycols; etc.

Example 10

The phosmer formed in Example 1 was reacted with n-octadecene-1 in the following manner:

22.9 gms. of the 1,10-decanediol phosmer of Example 1 dissolved in 150 ml. of toluene, and 21 gms. of n-octadecene-1 were heated at 110° C. for 22 hours. The mixture, after cooling, was poured slowly into 1.5 liters of acetone to cause the olefin derivative to precipitate. The supernatant liquid was decanted, and the precipitated polymer was dried under vacuum to give a pale yellow, rubbery product. The resulting derivative was soluble in mineral lubricating oil and imparted shear stability, anti-wear, anti-oxidant and anti-corrosion properties to the oil. The results of various tests of the derivative mixed with a mineral lubricating oil (Base Oil) are shown in Table II.

TABLE II

| | Derivative of 1,10-decanediol phosmer (octadecene-1) | Base Oil per se |
|---|---|---|
| (a) Viscosity, SUS at 210° F.[1] | 53.1 | 45.4 |
| (b) Viscosity Index [1] (Dean-Davis) | 129 | 115 |
| (c) 4-Ball Wear Test (Shell):[2] | | |
| Seize, Kg | 100 | 40 |
| Weld, Kg | 141 | 112 |
| Scar Dia. (mm.) at 1,200 r.p.m., 30 min. 100° C. and 20 Kg | 0.275 | 0.428 |
| (d) ERE Stability Test:[2][3] | | |
| Percent increase in viscosity | 1.5 | 143 |
| Cumulative mg. loss of Cu and Pb from strip | 29 | 536 |

[1] 3.6 wt. percent blend in base oil.
[2] 1.0 wt. percent blend in base oil.
[3] ERE Stability Test is conducted by heating a 500 ml. sample at 342° F. for 23 hours in the presence of a copper/lead alloy strip and simultaneously passing 2 s.c.f.h. air at atmospheric pressure through the sample while stirring. The percent viscosity increase is a measure of oxidation stability, and the loss, in mg., of Cu and Pb from the metal strip is a measure of corrosiveness.

The same derivative was tested for percent sonic breakdown. Briefly, the sonic breakdown test consisted of subjecting a 50 gm. sample (a 5 wt. percent blend of the derivative in a mineral lubricating oil having a kinematic viscosity of 9.22 centistokes) to the effects of a sonic oscillator. The oscillator was operated at 10 kilocycles and 200 watts. The duration of the test was 15 minutes at 37° C. The test showed a percent sonic breakdown of 3.8%, which is considered very good. Percent sonic breakdown is defined as:

$$\frac{\text{Viscosity of Blend after Shear} - \text{Viscosity Base Oil}}{\text{Viscosity of Blend before Shear} - \text{Viscosity Base Oil}} \times 100$$

Example 11, below, illustrates the preparation of the oxirane derivatives.

Example 11

3.8 gms. of liquid propylene oxide were slowly added, with stirring, to a mixture of 27 gms. of the 1-monostearin phosmer of Example 7 and 25 gms. of toluene over a period of 0.5 hour. During this addition, the temperature was maintained below 33° C. One hour after the addition had been completed, the toluene and excess propylene oxide were removed from the oxirane derivative by vacuum distillation. The product was a reddish, waxy solid which showed anti-wear and anti-oxidant properties in a mineral lubricating oil as illustrated in Table III which follows.

| | 1-monostearin phosmer treated with propylene oxide | Base Oil per se |
|---|---|---|
| (a) Viscosity, SUS at 210° F | [1] 46.0 | 45.5 |
| (b) 4-Ball Wear Test (Shell) Scar Dia. (mm.) (at 1,200 r.p.m., 100° C., 30 min. and 20 Kg.) | [2] 0.322 | 0.414 |
| (c) ERE Stability Test: | | |
| Percent increase in viscosity | [2] 12.1 | 143 |
| Cumulative mg. loss (Cu+Pb) | [2] 71 | 536 |

[1] 3.6 wt. percent blend of derivative in base oil.
[2] 1 wt. percent blend of derivative in base oil.

Example 12, below, illustrates the utility of the phosmers per se.

Example 12

One part by weight of the 1,10-decanediol phosmer of Example 1 is mechanically mixed with 99 parts by weight of a mineral lubricating oil having a viscosity of 112 SUS at 100° F. and a viscosity index of 113. The resulting mixture has improved lubricating properties.

Although the present invention has been described with a certain degree of particularity, it should be realized that numerous modifications and adaptations can be made within the spirit and scope of the invention as hereinafter claimed. The headings used throughout this description are not intended to be limiting, but rather are provided as a convenience to the reader.

We claim:
1. A process for preparing a rubber-like polymer containing phosphorus and sulfur, said polymer having an intrinsic viscosity in toluene within the range of 0.04 to 0.4 deciliter per gram, which comprises reacting a mixture of direactive material and $P_4S_{10}$ in a solvent at an $H_2S$ evolving temperature in the range of from about 30° to 150° C. for a time sufficient to form substantial amounts of said polymer, and thereafter recovering said polymer: said direactive material having the formula:

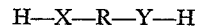

wherein H represents hydrogen, X and Y each represent a member selected from the group consisting of O, S and NH, and R represents a skeletal structure providing at least 4 carbon atoms between the X and Y members, R being selected from the group consisting of alkylene, arylene, alkarylene, aralkylene and divalent organic radicals containing an element from the group consisting of oxygen, sulfur and nitrogen incorporated within the skeletal backbone;

the mole ratio of said direactive material to P$_4$S$_{10}$ being within the range of from 1:1 to 10:1;
said solvent being capable of achieving a homogeneous mixture of said reactants.

2. A process as defined by claim 1, wherein the direactive material is a dihydroxy compound.

3. A process as defined by claim 1, wherein the direactive material is a diamino compound.

4. A polymeric composition of matter prepared according to the process defined by claim 1.

5. A polymer prepared by the process of claim 1 wherein the said direactive material is 1,10-decanediol.

6. A polymer prepared by the process of claim 1 wherein said direactive material is 1,12-octadecanediol.

7. A polymer prepared by the process of claim 1 wherein the said direactive material is 1,6-hexanediamine.

8. A polymer prepared by the process of claim 1 wherein the said direactive material is triethanolamine monooleate.

9. The reaction product obtained by reacting a polymer prepared by the process of claim 1 with a molar excess of an additional reactive material from the class consisting of oxiranes of from 2 to 20 carbon atoms and monoolefins of from 2 to 20 carbon atoms at a temperature in the range of from 5° to 110° C. for a time, within the range of 0.1 to 30 hours, sufficient to remove the hydrogen atom from a SH radical of said polymer and thereby effect linkage between said polymer and said reactive material through a sulfur atom.

10. The product defined by claim 9 wherein said direactive material is 1,10-decanediol and said additional reactive material is octadecanediol-1.

References Cited

UNITED STATES PATENTS

| | | | |
|---|---|---|---|
| 2,419,584 | 4/1947 | Noland | 252—46.6 |
| 2,684,334 | 7/1954 | Ryan et al. | 252—46.6 |
| 2,802,856 | 8/1957 | Norman et al. | 260—978 |
| 2,910,500 | 10/1959 | Schrader et al. | 260—461 |
| 3,070,619 | 12/1962 | Lanham | 260—981 |
| 3,089,850 | 5/1963 | McConnell et al. | 260—981 |
| 3,094,548 | 6/1963 | Price et al. | 260—461 |
| 3,159,664 | 12/1964 | Bartlett | 260—981 |
| 3,197,496 | 7/1965 | LeSuer | 260—928 |

FOREIGN PATENTS 794,597  8/1958  Great Britain.

DONALD E. CZAJA, *Primary Examiner.*

LEON J. BERCOVITZ, DANIEL E. WYMAN, *Examiners.*

L. G. XIARHOS, C. W. IVY, *Assistant Examiners.*